United States Patent Office 3,153,986
Patented Oct. 27, 1964

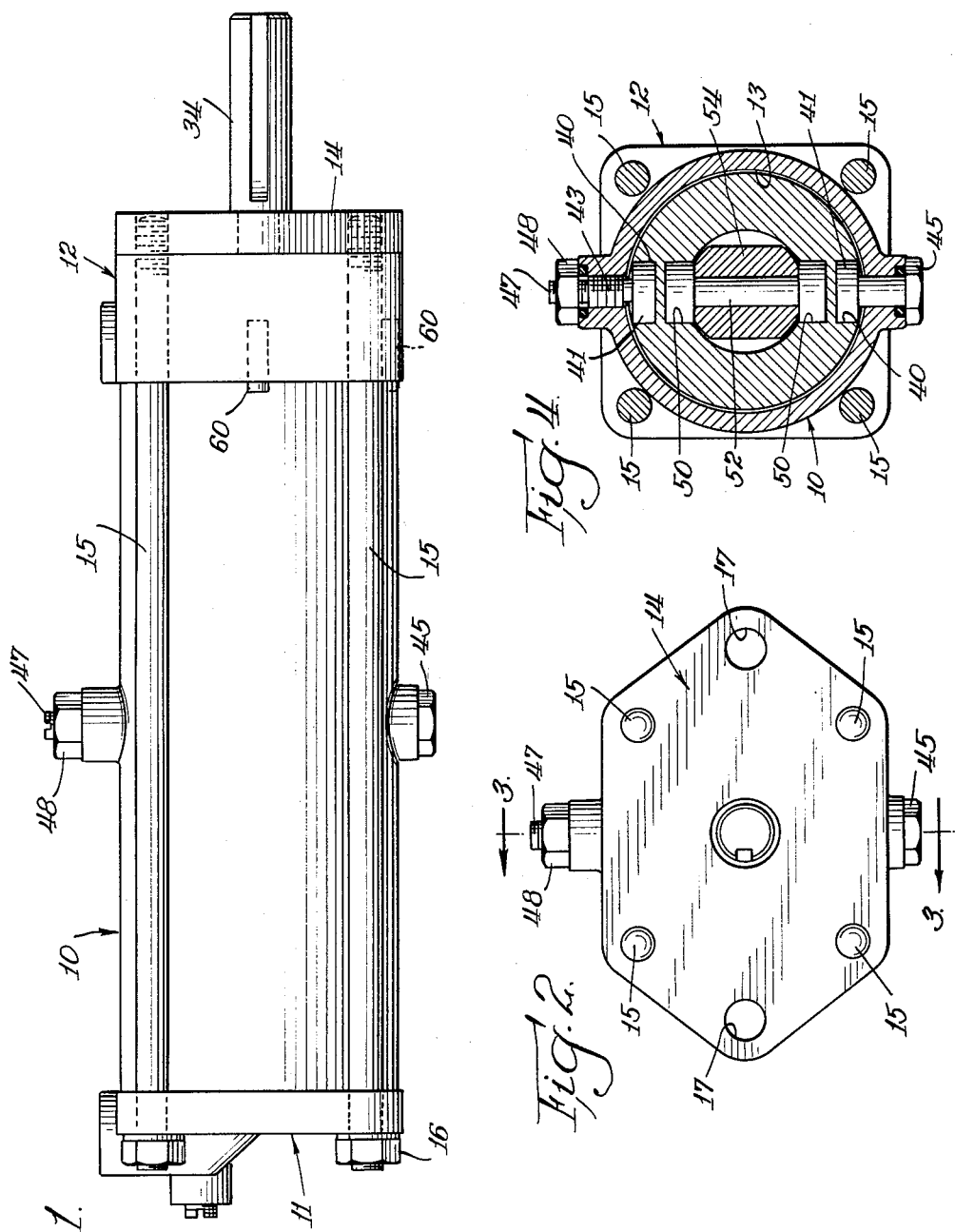

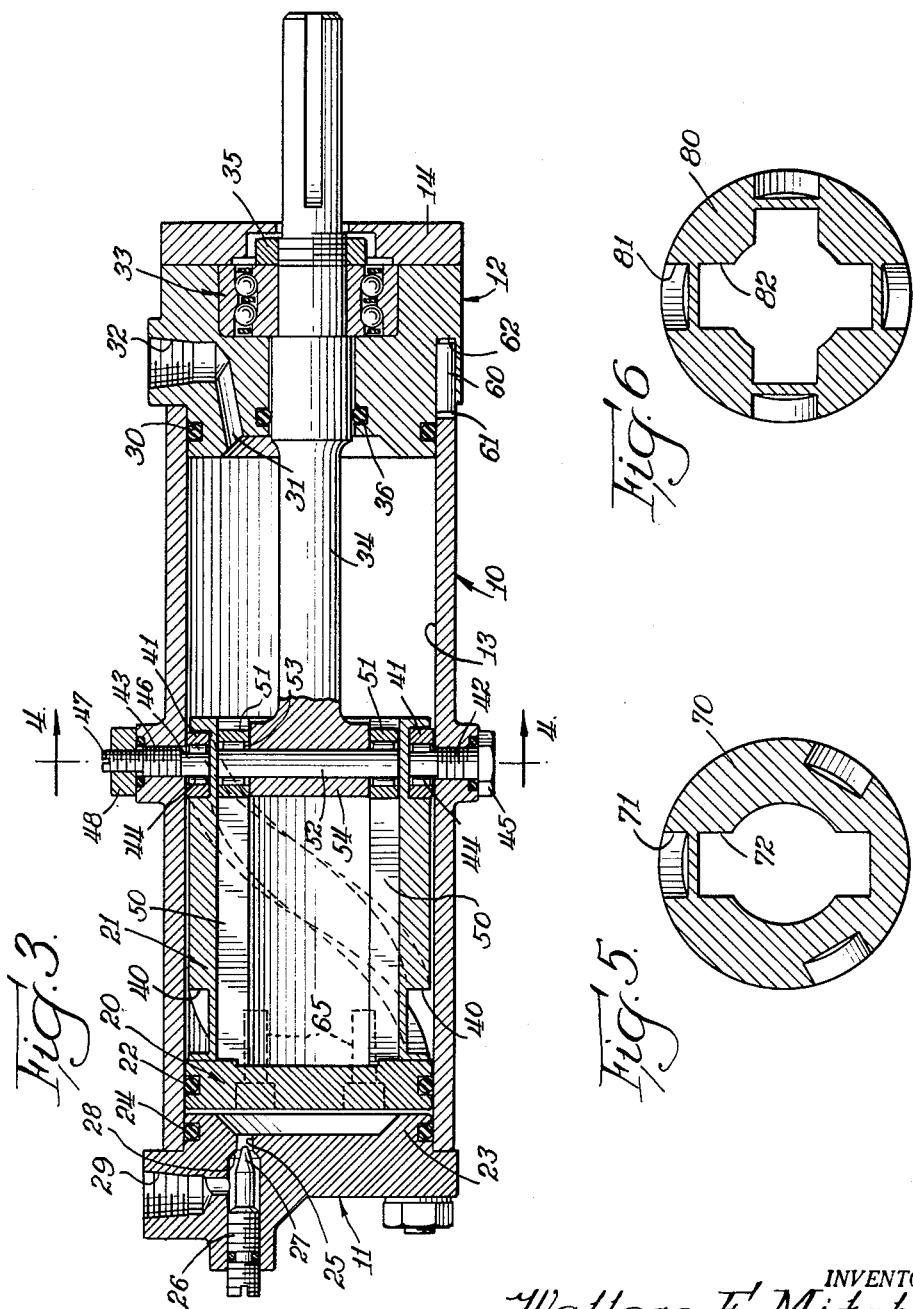

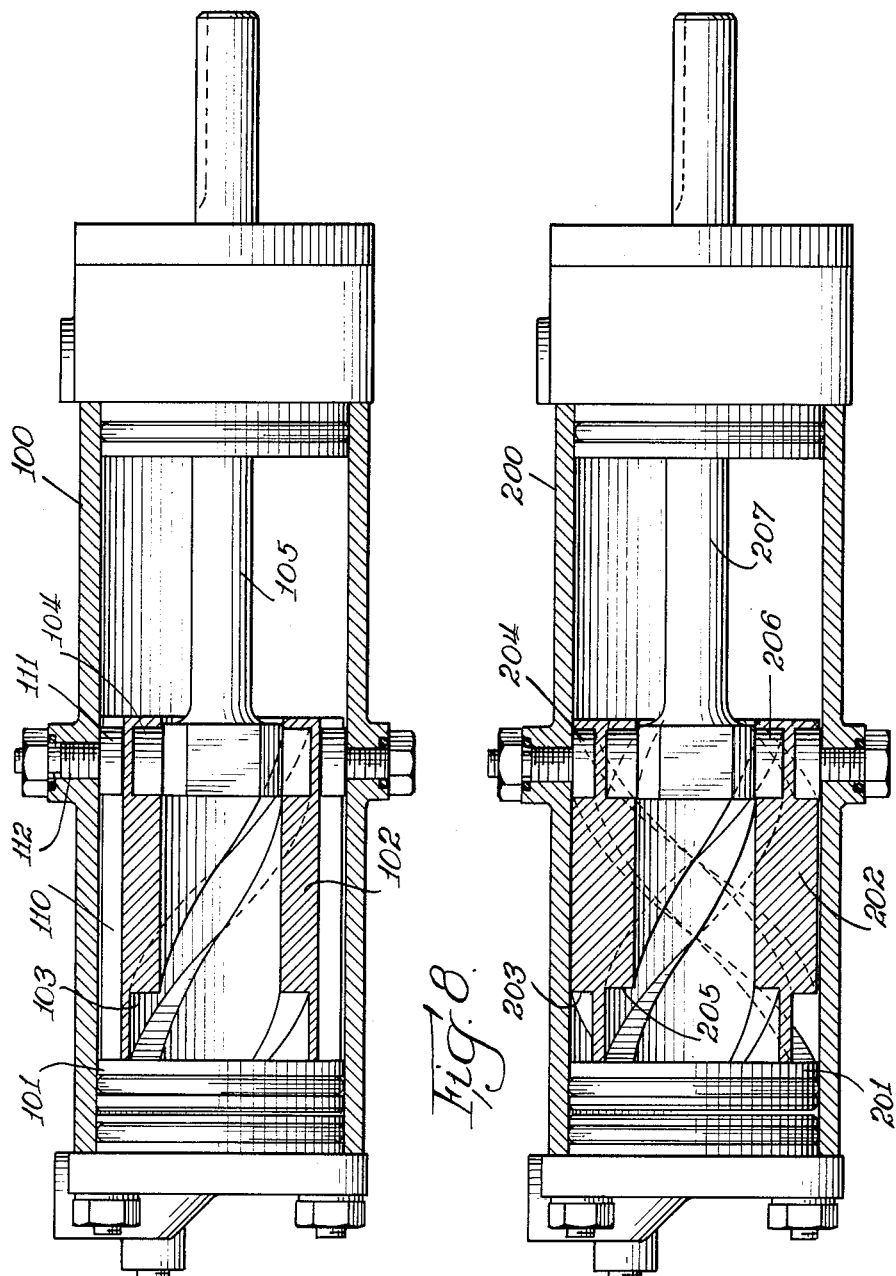

3,153,986
ROTARY TORQUE ACTUATOR
Wallace Frederick Mitchell, 916 W. Campbell St.,
Arlington Heights, Ill.
Filed Dec. 30, 1960, Ser. No. 79,644
4 Claims. (Cl. 92—33)

This invention relates to fluid motors and more particularly to a new and improved rotary torque actuator.

Rotary torque actuators are used to produce rotary torque upon the application of fluid pressure thereto. They are used for numerous applications, such as in operating gates, valves, bending devices, flip-over or roll-over devices, dumping devices, and a large number of other applications.

In one typical example of known rotary torque actuator, a piston is slidably mounted by a pair of guide rods fixed in a cylinder for longitudinal movement in the cylinder and has an interior helical portion sliding in a helical groove in a piston rod rotatably supported in the cylinder. Upon the introduction of fluid (either gaseous or liquid) into the cylinder on either side of the piston, the latter is urged in a longitudinal direction and effects rotation of the piston rod in a corresponding direction. The piston rod projects at both ends from the cylinder for connection to the device to be actuated. Such prior devices are not entirely satisfactory for the reasons that they are subject to jamming; require a large number of liquid seals; are subject to sliding friction between the piston and piston rod; require very close tolerances in manufacture; are limited as to the fluid pressure which can be employed; and are expensive to manufacture.

An object of the present invention is to provide a new and improved rotary torque actuator.

Another object is to provide a rotary torque actuator of simple and inexpensive construction which has a minimum number of seals, is not subject to jamming, does not require close tolerances in manufacture, and requires no external bearings.

Another object is to provide a rotary torque actuator which can be made in a wide range of sizes, is adapted to be operated under a wide range of fluid pressures, and which may be constructed in a wide range of pitches of the cam track.

Another object is to provide a rotary torque actuator of such construction that it may be formed so that the piston has a relatively short stroke, but provides angular movement of the drive shaft through any angle up to 360°.

Another object is to provide a rotary torque actuator wherein the unit pressure between the camming members may be made relatively low.

Another object is to provide a rotary torque actuator wherein a plurality of followers are provided for cooperation with a cam track and wherein one of the followers may be made adjustable relative to the other followers in order to obtain accurate registration between the followers and the cam track and a bearing between all the followers and the cam track.

Other objects and advantages will appear from the following description taken in connection with the appended drawings wherein:

FIGURE 1 is a side elevational view of one form of rotary torque actuator constructed in accordance with my invention;

FIG. 2 is an end elevational view of the actuator of FIG. 1;

FIG. 3 is a longitudinal sectional view taken along line 3—3 of FIG. 2;

FIG. 4 is a transverse sectional view taken along line 4—4 of FIG. 3;

FIG. 5 is a transverse sectional view through a modified form of cam for an actuator having two internal cam surfaces and three external cam surfaces;

FIG. 6 is a transverse section through a second modified form of cam wherein is provided four internal cam surfaces and four external cam surfaces;

FIG. 7 is an elevational view partly in cross-section showing a fourth form of actuator; and FIG. 8 is an elevational view partly in cross-section of a fifth form of actuator.

Referring now particularly to FIGS. 1 to 4 of the drawings, the actuator of my invention includes a cylinder formed by a casing or cylinder barrel 10 of generally hollow tubular form, an end head or cap 11, and a second end head or cylinder base 12, and defining a chamber 13. Disposed outwardly of the right-hand end head or cylinder base 12 is a mounting base 14. A plurality of tie-rods 15 are provided which are threaded into the end of the mounting base 14 and extend through the cylinder base 12 and the head 11 and are secured in place by nuts 16.

The right-hand end head or cylinder base is held against angular or rotary movement relative to the cylinder by the provision of a plurality of keys 60, each of which is disposed in a notch 61 in the right-hand end of the cylinder and a socket 62 in the end head 12 in position to receive such key.

The mounting base 14 extends laterally beyond the cylinder base and has openings 17 adapted to receive bolts or screws (not shown) for mounting the actuator in position on other apparatus (not shown) for use. The piston 20 is slidable in the cylinder and carries a cam member 21 hereinafter described more in detail. The cam preferably is secured to the piston by a plurality of circumferentially spaced bolts 65 countersunk into the piston and extending therethrough and threaded into the cam. The piston 20 is sealed in the cylinder by piston seal 22 which preferably takes the form of an O-ring whereby fluid cannot pass from one side of the piston 20 to the other.

The left-hand end head or cap 11 is preferably of generally circular form and has an inner portion 23 adapted to fit snugly in the corresponding end of the cylinder. A sealing ring 24, preferably of the O-ring type, is provided for sealing the cap in the cylinder. The cap has an inlet-outlet passage 25 which leads into the chamber 13 on the left-hand side of the piston 20 for admitting motive fluid into the cylinder. A plug 26 is threaded into the inlet-outlet opening 25 and has a tapered end valve 27 cooperating with a valve seat 28 whereby the inlet-outlet passage may be adjusted in size to control the rate admission of fluid into the cylinder and consequently the speed of operation of the device. The inlet-outlet passage is provided with a threaded portion 29 whereby a pipe (not shown) may be attached to the actuator for conducting fluid thereto from a source (not shown) of fluid under pressure.

The right-hand end of the cylinder is closed by the end head or cylinder base 12 having an O-ring seal 30 sealing it in the end of the cylinder. The base 12 is provided with an inlet-outlet passage 31 which leads from the chamber 13 on the opposite side of the piston from the inlet-outlet passage 26. The inlet-outlet passage 31 is provided with a threaded portion 32 for attachment of a pipe (not shown) leading to a second source of fluid under pressure (not shown). In this connection, it will be understood that only a single source of fluid under pressure may be provided and a valve (not shown) of suitable construction may be provided for switching the connection to the source from one end of the cylinder to the other.

The base 12 is provided with a bearing 33, preferably of the ball-bearing type, for rotatably supporting a drive shaft 34 which carries a thrust bearing lock nut 35 adapted to bear against the inner race of the ball-bearing, the outer race of the ball-bearing being retained by the cylinder mounting base 14. A rotary seal 36, preferably of the O-ring type, is provided for sealing the shaft 34 in the base 12. The drive shaft is connected to the piston 20, in a manner hereinafter to be described, for actuation thereby.

The cam 21 preferably is of cylindrical form and is secured at its left-hand end to the piston 20 for longitudinal and rotary movement together with the piston.

The cam member or cam 21 is formed in its outer surface with a plurality of cam grooves 40 of helical form. In the embodiment shown in FIGS. 1 to 3, two cam grooves are provided which are disposed diametrically opposite on the surface of the cam and each has a pitch such that it extends throughout 180° from one end of the cam to the other. A pair of cam rollers or followers 41 are provided which are disposed respectively in the two cam grooves 40. The rollers 41 are carried respectively on axles 42, 43 which are threaded into the housing at diametrically opposite points and extend through the housing so that they are accessible from the outside. The entire axle 42 is symmetrical with respect to the corresponding roller 41 and the roller is mounted on the axle by needle bearings 44. The axle is formed with a head 45 whereby it can be screwed into the housing in position to hold the roller 41 in its corresponding groove.

The second axle 43 is slightly different in construction from the first axle 42. The axle 43 is so arranged that it has an inner portion 46 which carries the roller 41 and which is offset from the main, threaded portion so that, upon rotation of the axle 43 in the housing, the corresponding roller 41 is moved eccentrically with respect to the axis of the main, threaded portion of the axle whereby the roller may be adjusted relative to its corresponding cam groove 40. In order to permit such adjustment, the axle 43 is provided with a reduced threaded portion at its outer end and instead of having a head, as does the other axle 42, it is provided with a nut 48. Upon loosening of the nut 48, the axle 43 may be turned in its socket in order to adjust the roller 41 eccentrically.

The adjustment of the one roller 41 about the axis of the axle 43 insures that both rollers are maintained simultaneously in firm contact with the same side edge of the corresponding cam slot so that the cam will move longitulinally and rotate, as hereinafter explained, without any looseness or any binding taking place. It would be obvious that the adjustment of the one roller is sufficient to adjust the relative positions of the rollers so that the desired positioning of the rollers with respect to the cam can be effected.

The cam is provided with a pair of inner cam slots 50 which extend longitudinally, parallel to the axis of the cam 21 from the right-hand face of the piston through the right-hand end of the cam 21. Disposed in the inner straight cam slots 50 are a pair of rollers 51 suitably mounted on a transverse drive shaft axle 52 by needle bearings 53. The drive shaft axle 52 extends through an enlarged head 54 formed on the drive shaft 34 and disposed within the end of the cam 21. Thus the rollers 51 are mounted for rotation about a common axis which is fixed relatively to the drive shaft 34, but which is rotatable about the axis of the drive shaft 34.

Assuming the piston 20 and cam 21 to be in the position shown in FIG. 3, fluid is admitted to the inlet-outlet 25 and urges the piston in a corresponding direction (to the right, as viewed in FIG. 3). The rightward movement of the cam 21 causes it to be rotated about its longitudinal axis by reason of the engagement between the outer cam tracks 40 and the cam rollers 41 which, as above explained, are rotatable about axes fixed with respect to the cylinder 10. Rotation of the cam 21 about its axis causes the inner cam tracks 50 to engage the inner or drive rollers 51 which rollers, acting through the shaft axle 52, cause the shaft 34 to be rotated about its axis. The rotation of the drive shaft 34 is continued so long as fluid is admitted to the cylinder under pressure and drives the piston to the right. During the movement of the piston to the right, fluid which was in the cylinder on the right-hand side of the piston is discharged in suitable amount through the right-hand inlet-outlet in order to permit the movement of the piston to the right. Conversely, during the movement of the piston from the right to the left, fluid which is on the left-hand side of the piston is discharged through the left-hand inlet-outlet. Upon discontinuance of the pressure, or upon engagement between the right-hand end of the cam and the right-hand end head base, rotation of the shaft is halted.

The piston may be moved in the opposite direction (to the left, as viewed in FIG. 3), and the shaft rotated in the opposite direction by discontinuing the admission of fluid through the inlet-outlet opening and admitting fluid under pressure through the right-hand inlet-outlet 31 and discharging fluid from the left-hand inlet-outlet.

The helical cam grooves 40, as shown in FIGS. 1 to 4, for example, extend through 180° around the periphery of the cam. However, it will be understood that they may extend through a greater or lesser extent and may extend up to 360°. It will be understood, of course, that the greater the angular extent of the helical cam groove about the cam for any given length of cam, the steeper the pitch or angle of the groove, the less the torque will be for any given pressure of fluid.

The actuator may be formed with more than two cam rollers and with a corresponding number of cam tracks, as shown particularly in FIG. 5 of the drawings. In FIG. 5, only the cam 70 is illustrated, but it will be understood that the remainder of the device is similar to that shown in FIG. 3, except there are three cam rollers and three cam tracks 71 for cooperation with such rollers. On the other hand, the cam 70 is provided with two straight drive roller tracks 72 for cooperation with two drive rollers (not shown), such as provided in the device of FIG. 3.

Where an equal number, and more than two, sets of cam rollers and drive rollers are provided, the cam has a corresponding number of cam tracks and drive roller tracks, such as illustrated for example in FIG. 6. In FIG. 6, the cam 80 is provided with an equal number of cam roller tracks 81 and drive roller tracks 82 and each cam roller track is disposed opposite the drive roller track, as illustrated. It will be understood, of course, that an actuator utilizing the cam of FIG. 6 will be provided with four circumferentially spaced cam rollers (not shown) suitably mounted, and four circumferentially spaced drive rollers (not shown) suitably mounted in a manner corresponding to the rollers and mounting means therein shown in FIG. 3 of the drawings.

While more than four cam rollers and drive rollers may be employed, it ordinarily will not be found advantageous and I prefer to limit the number to not more than four. However, where such a larger number is provided, it will be understood that they will be equally spaced circumferentially around the cam. Where there are the same number of cam grooves and drive roller grooves, they will be preferably arranged opposite to each other in accordance with the principles illustrated in FIG. 6. On the other hand, where there are an unequal number of cam roller grooves and drive roller grooves, at least some of the grooves will not be arranged in opposite relation, as will be obvious.

Instead of forming the helical cam groove on the outer surface of the cam, and the straight drive groove on the inner surface, this arrangement may be reversed and the straight drive grooves may be formed on the outer surface of the cam and the helical cam grooves formed on the inner surface.

Such a construction is shown in FIG. 7 to which reference now is made. In FIG. 7, the construction is similar in all respects to the constructon of the device shown in FIGS. 1 to 4, except as hereinafter pointed out, and accordingly the construction is not described in full detail. In the embodiment of FIG. 7, a cylinder 100 is provided which is closed at both ends, similarly to the FIGS. 1 to 4, and in which a piston 101 carrying a cam 102 is slidable. The cam 102 is provided on its internal surface with two diametrically opposed cam slots 103 of helical form which extend from one end to the other of the cam and which have a pitch such that they preferably extend throughout 180° from one end to the other. A pair of drive rollers 104 are provided which ride in the cam slots 103, respectively, and are carried by a drive shaft 105 journalled in the right-hand end head or base of the cylinder 100.

The cam also is provided with two diametrically opposed straight drive slots 110 in its outer surface which cooperate with two diametrically opposed drive rollers 111 rotatably mounted on axles 112 extending through and into the cylinder 100 and fixedly supported therein. In this case, the axles are shown as concentric, but it will be understood that one of them may be offset or eccentric, in a manner similar to that described in connection with the embodiment shown in FIGS. 1 to 4 of the drawings.

In the operation of the embodiment of the invention shown in FIG. 7, assuming the piston and cam to be at the left-hand side of the cylinder as shown in FIG. 7, admission of fluid under pressure into the left-hand inlet-outlet causes the piston to be moved to the right in the cylinder. Owing to the fact that the straight slots 110 cooperate with the rollers 111 which rotate about fixed axes, the cam is not rotated as it is moved to the right. However, such straight slots 110 serve to prevent rotation of the cam in the cylinder and to compel it to move longitudinally without rotation. The helical cam slots 103 in the cam cooperate with the rollers 104 carried by the drive shaft 105 and cause the drive shaft to be rotated as the cam is moved in the cylinder. Thus, the drive shaft is rotated in an appropriate direction corresponding to the movement of the piston and the cam.

Upon movement of the cam and piston from right to left in the cylinder, the shaft is rotated in a direction opposite to that which it is rotated when the piston and cylinder move from left to right in the cylinder.

A further embodiment of the invention is illustrated in FIG. 8 wherein means are provided for effecting rotation of the drive shaft through approximately 360° of rotation upon movement of the piston from one end of the cylinder to the other. This is effected by providing a cylinder 200 in which is slidable a piston 201 which carries a cam 202. The cam 202 is formed with a pair of helical guide slots 203 in its outer surface which cooperate with rollers 204 mounted for rotation on axes fixed with respect to the cylinder 200. The cam slots 203 have a pitch such that they extend through an angle of 180°. That is to say, the terminal ends of each cam slot 203 are disposed at 180° around the cylindrical cam with respect to each other. A second pair of cam slots 205 are formed in the inner surface of the cam 200 and cooperate with an inner pair of cam rollers 206 which are carried by a drive shaft 207. The inner cam slots are also formed with such a pitch that their left-hand ends are disposed at 180° around the cam from their right-hand ends and thus in traversing the inner cam slots, the rollers 206 each describe a movement of 180°, as in the case of the fixed rollers 204.

The outer cam slots and the inner cam slots are pitched in opposite directions, that is to say, the outer cam slots have a right-hand pitch (viewing the structure from the left-hand end), and the inner slots have a left-hand pitch. Thus, as the cam is moved throughout its entire extent of longitudinal movement in one direction to the other, the shaft is rotated through 180° with respect to the cam. Thus, the total angular displacement or rotation of the drive shaft relative to the cylinder is 360°.

It will be understood that where more than two cam rollers are used or more than two drive rollers are used, and it is found desirable to provide for adjustment of the rollers, all of such rollers in each set, except one roller are made adjustable. While all of the rollers may be made adjustable, this is not necessary. The non-adjustable roller serves as the locating roller and the remaining rollers of each set are adjusted so that all of the rollers of the set bear against one face of the cam seat.

From the foregoing, it will be seen that the present invention provides a novel and improved rotary torque actuator. The piston provides a bearing in addition to the shaft bearing at the end of the cylinder and no external bearing for the shaft is required. The structure is relatively simple and inexpensive and can be readily manufactured and assembled. Only a relatively small number of seals are required and they can be formed as simple and efficient O-ring seals. The arrangement is such that there is no binding or racking, but the piston and connected cam move throughout their travel in the cylinder with a minimum of friction or other resistance to movement. The structure does not have to be made to close tolerances and therefore can be made inexpensively. There is no practical limit to the fluid pressure that can be applied since there is no binding of the parts; the only practical limit is that imposed by the seals and the strength of the parts. The device may be made in a wide range of sizes and in a wide variety of forms, as indicated in part by the foregoing description. The angular extent of the cam surface and the pitch may be varied widely, the only result being a variation in the extent of angular movement of the drive shaft and in the mechanical advantage of the device.

I claim:

1. A rotary torque actuator comprising a cylinder, a piston slidable in said cylinder, fluid inlets opening into said cylinder on opposite sides of said piston, a hollow internally and externally cylindrical cam member in said cylinder connected to said piston, said cam member having a plurality of internal and external cam faces formed in its cylindrical surfaces, at least two of said cam faces being on the same surface and being helical about the axis of said cylinder, a plurality of cam followers disposed to ride against said external cam faces, an eccentrically adjustable means respectively related to each but one of said cam followers for adjusting the related follower relative to said cam faces, a drive shaft projecting from said cylinder and being journalled in an end thereof for rotational movement, and at least two other cam followers carried by said drive shaft and disposed in engagement with said inner cam faces for imparting rotational movement to said shaft upon longitudinal movement of said cylinder.

2. A rotary torque actuator comprising a cylinder, a piston slidable in said cylinder, fluid inlets opening into said cylinder on opposite sides of said piston, a hollow internally and externally cylindrical cam member in said cylinder connected to said piston, said cam member having a plurality of internal and external cam faces formed in its cylindrical surfaces, at least two of said cam faces being on the same surface and being helical about the axis of said cylinder, a plurality of cam followers disposed to ride against said external cam faces, an eccentrically adjustable means respectively related to each but one of said cam followers for adjusting the related follower relative to said cam faces, each of said adjustable cam followers including a roller, a stub shaft supporting said roller, and means for securing and eccentrically adjusting said stub shaft, a drive shaft projecting from said cylinder and being journaled in an end thereof for rotational movement, and at least two other cam followers carried by said drive shaft and disposed in engagement with said inner cam faces for imparting rotational movement to said shaft upon longitudinal movement of said cylinder.

3. A rotary torque actuator comprising a cylinder, a piston slidable in said cylinder, fluid inlets opening into said cylinder on opposite sides of said piston, a hollow internally and externally cylindrical cam member in said cylinder connected to said piston, said cam member having a plurality of internal and external cam faces formed in its cylindrical surfaces, at least two of said cam faces being on the same surface and being helical about the axis of said cylinder, a plurality of cam followers disposed to ride against said external cam faces, an eccentrically adjustable means respectively related to each but one of said cam followers for adjusting the related follower relative to said cam faces, each of said adjustable cam followers including a roller, a stub shaft supporting said roller, and means for securing and eccentrically adjusting said stub shaft, said securing means being threaded into said cylinder to provide axial and eccentric roller adjustments, a drive shaft projecting from said cylinder and being journalled in an end thereof for rotational movement, and at least two other cam followers carried by said drive shaft and disposed in engagement with said inner cam faces for imparting rotational movement to said shaft upon longitudinal movement of said cylinder.

4. A rotary torque actuator comprising a cylinder, a piston slidable in said cylinder, fluid inlets opening into said cylinder on opposite sides of said piston, a hollow internally and externally cylindrical cam member in said cylinder connected to said piston, said cam member having a plurality of internal and external cam faces formed in its cylindrical surfaces, at least two of said cam faces being on the same surface and being helical about the axis of said cylinder, a plurality of cam followers disposed to ride against said external cam faces, an eccentrically adjustable means respectively related to each but one of said cam followers for adjusting the related follower relative to said cam faces, each of said adjustable followers including a roller, a stub shaft mounting said roller, and an adjustable support member secured to said cylinder for eccentrically positioning the axis of said stub shaft, a drive shaft projecting from said cylinder and being journalled in an end thereof for rotational movement, and at least two other cam followers carried by said drive shaft and disposed in engagement with said inner cam faces for imparting rotational movement to said shaft upon longitudinal movement of said cylinder.

References Cited in the file of this patent

UNITED STATES PATENTS

| | | |
|---|---|---|
| 416,147 | Edgerton | Nov. 26, 1889 |
| 1,005,763 | Adams | Oct. 10, 1911 |
| 1,481,568 | Smith | Jan. 22, 1924 |
| 1,932,915 | Taylor | Oct. 31, 1933 |
| 1,946,309 | Coffman | Feb. 6, 1934 |
| 1,951,031 | Nardone | Mar. 13, 1934 |
| 1,951,032 | Nardone | Mar. 13, 1934 |
| 2,144,195 | Nardone | Jan. 17, 1939 |
| 2,199,328 | Baer et al. | Apr. 30, 1940 |
| 2,205,333 | Baer | June 8, 1940 |
| 2,275,640 | Nardone | Mar. 10, 1942 |
| 2,375,029 | Nardone | May 1, 1945 |
| 2,515,342 | Glaser | July 18, 1950 |
| 2,959,064 | Geyer et al. | Nov. 8, 1960 |

FOREIGN PATENTS

| | | |
|---|---|---|
| 23,980 | Great Britain | 1902 |